United States Patent [19]

Petit

[11] Patent Number: 5,015,435
[45] Date of Patent: May 14, 1991

[54] DEVICE FOR DEMOUNTABLE FASTENING OF A GUIDE TUBE INTO AN END FITTING OF A FUEL ASSEMBLY OF A NUCLEAR REACTOR

[75] Inventor: Bernard Petit, Saint Genis Laval, France

[73] Assignees: Framatome, Courbevoie; Cogema, Velizy Villacoublay, both of France

[21] Appl. No.: 409,181

[22] Filed: Sep. 19, 1989

[30] Foreign Application Priority Data

Sep. 19, 1988 [FR] France ............................... 88 12212

[51] Int. Cl.⁵ .............................................. G21C 3/32
[52] U.S. Cl. .................................... 376/285; 376/446; 376/449
[58] Field of Search ............... 376/353, 446, 449, 285; 411/44, 45, 54, 57, 60, 338, 339; 285/222; 29/522.1, 523, 512

[56] References Cited

U.S. PATENT DOCUMENTS

| 3,856,621 | 11/1974 | Suvanto et al. | 376/271 |
| 4,617,171 | 10/1986 | Feutrel | 376/446 |
| 4,631,168 | 12/1986 | Shallenberger et al. | 376/446 |
| 4,702,656 | 10/1987 | Kerrom | 411/60 |

FOREIGN PATENT DOCUMENTS

| 0098774 | 1/1984 | European Pat. Off. | 376/446 |
| 2493024 | 4/1982 | France | 376/446 |

Primary Examiner—Daniel D. Wasil

[57] ABSTRACT

The sleeve (20) for locking the guide tube has an outer surface comprising successivley a cylindrical and a frustoconical part in the axial direction, without any radially protruding part. The upper cylindrical part (25) of the sleeve constitutes a fastening shell of the sleeve (20) in the end fitting of the assembly and the lower frustoconical part (24) a ring for expanding the guide tube. The fastening shell (25) the thickness of which is substantially smaller than the thickness of the ring (24) can be distorted into cavities machined in the end fitting of the assembly. An annular interlocking groove (20) is machined in the upper part of the ring (24).

3 Claims, 5 Drawing Sheets

DEVICE FOR DEMOUNTABLE FASTENING OF A GUIDE TUBE INTO AN END FITTING OF A FUEL ASSEMBLY OF A NUCLEAR REACTOR

FIELD OF THE INVENTION

The invention relates to a device for demountable fastening of a guide tube into an end fitting of a fuel assembly of a nuclear reactor cooled with light water and in particular of a reactor cooled by pressurized water.

BACKGROUND OF THE INVENTION

Water-cooled nuclear reactors and, in particular, pressurized-water nuclear reactors comprise assemblies consisting of a bundle of fuel rods of great length arranged parallel to each other and held in a framework consisting of guide tubes, spacers and two end fittings. The guide tubes are arranged in the longitudinal direction of the assembly and are connected to transverse spacers arranged at regular intervals along the length of the assembly.

At each of their ends, the guide tubes are also connected to either of the two end fittings constituting the stiffening and closure parts of the assembly.

The fuel rods of the assembly form a bundle in which the rods are parallel to each other and arranged, in the transverse sections of the assembly, according to a uniform lattice determined by the spacers. Certain positions in the lattice are occupied by guide tubes which are generally connected rigidly to the spacers.

The guide tubes have a length which is greater than the length of the fuel rods and are placed in the bundle so as to have a part which projects relative to the bundle of fuel rods at each of their ends. The end fittings are fastened to these projecting parts of the guide tube so as to ensure the closure of the assembly at each of its ends.

The fuel rods consist of sintered pellets of nuclear fuel material stacked inside a metal sheath isolating the pellets from the fluid surrounding the fuel assembly. In the case of a sheath rupture in a fuel assembly rod, it is necessary to replace this rod very quickly to avoid leakages of radioactive product into the reactor coolant fluid. To gain access to the fuel rods and to perform their replacement, it is necessary to dismantle one of the end fittings of the assembly, and this involves removing the connections between the corresponding ends of the guide tubes and the end fitting.

The end fittings comprise passage holes reproducing the lattice of the guide tubes in each of which a guide tube is engaged and fastened.

In order to make it possible to replace defective rods in fuel assemblies, new fuel assemblies have been designed and developed, comprising guide tubes whose connection to at least one of the end fittings is demountable.

To perform the replacement of the defective fuel rods, the assembly is placed under water in a vertical position, in a pool such as a storage pool; the assembly rests on the bottom of the pool by means of its lower end fittings. The other, upper end fitting is accessible under a certain depth of water from above the pool.

In a known type of demountable fuel assembly, the parts of the guide tubes engaged in the upper end fitting of the assembly comprise a radially expandable part which can be, for example, attached to the end of the guide tube. This expandable part can consist of a split ring having a part which projects radially outwards and which is intended to be housed in a cavity of corresponding shape machined inside the end fitting, in the passage hole for the guide tube. A locking sleeve introduced inside the guide tube produces the radial expansion of the split ring and the interlocking of the guide tube by its radially projecting part which fits inside the cavity machined in the end fitting.

The guide tube is engaged in the hole passing through the adapter plate of the end fitting only over a certain length, the remaining part of the hole, above the guide tube, opening out onto the upper face of the adapter plate of the end fitting.

There is a known demountable connection for a guide tube of a fuel assembly of the type described above, comprising a locking sleeve having a ring ensuring the expansion of the guide tube and extended axially by a fastening shell which, when the locking sleeve is fitted into the guide tube, is housed in the part of the hole situated above the guide tube and opening onto the upper face of the adapter plate.

Radial cavities are provided in this part of the hole of the adapter plate and, after the locking sleeve has been fitted into the guide tube, the fastening shell is distorted so that the distorted parts of this fastening shell enter inside the cavities to produce the axial and rotational locking of locking sleeve.

Efficient fastening of the guide tube is thus obtained by means of operations which can be performed without difficulty from above the assembly.

However, the dismantling of the guide tube makes it necessary, as a first step, to perform the extraction of the locking sleeve, which is held in the end fitting by the fastening shell. This operation can be performed by a tool which is introduced into the sleeve and which comprises radially moveable parts which can be placed under the lower end of the sleeve. Traction is applied to the tool to allow the fastening shell to be unlocked and the sleeve to be extracted from the guide tube.

This operation of extracting the locking sleeve before dismantling the end fitting of the assembly requires the use of complex tooling whose positioning, in the axial direction, inside the opening of the end fitting and of the sleeve, must be adjusted with great accuracy, so that the movable parts come to bear on the lower end of the sleeve when traction is applied to the tool. In addition, it is very difficult to check that the tool has been correctly fitted inside the sleeve, from the upper level of the pool.

Furthermore, the extraction of the sleeve is produced by a thrust on its lower end, with the result that this sleeve is liable to undergo some buckling, which makes the extraction more difficult.

Finally, the distorted regions of the fastening shell entering the cavities of the end fitting are extracted from the cavities only with difficulty when a thrust is applied to the lower end of the sleeve.

There has also been disclosed in EP-A-0.098.774 a locking sleeve comprising an annular groove machined in the inner part of the sleeve, in an upper radially widened part of the locking sleeve also comprising the deformable shell. Such a locking sleeve has some advantages, as the extraction of the sleeve may be effected by introducing a tool in the annular groove and by exerting traction on the sleeve through a part of its inner bore.

However, such a sleeve, having a radially widened upper part and a radially extending outer rim separating the upper part from the lower locking part of the sleeve, requires the end fitting of the assembly to be specially machined, at the level of the opening receiving the guide tube. Additionally, the shape of the sleeve requires more complicated and expensive forming or machining operations.

SUMMARY OF THE INVENTION

The purpose of the invention is therefore to provide a device for demountable fastening of a guide tube into an end fitting of a fuel assembly of a nuclear reactor cooled by light water, comprising a bundle of parallel fuel rods held in a framework consisting of guide tubes, spacers and end fittings fastened to the ends of the guide tubes. At least one of the end fittings is fastened demountably to one of the ends of each of the guide tubes by means of an end part of the guide tube which can be distorted radially and which has an interlocking part projecting radially outwards, engaged inside and over a part of the length of an opening passing through the end fitting and comprising, in its part receiving the guide tube, an annular widening intended to receive the interlocking parts of the guide tube. Radial expansion of the end of the guide tube and the holding of its interlocking parts in the annular widening of the opening of the end fitting are provided by a locking sleeve comprising a ring for expanding the guide tube and a shell for fastening in the end fitting, remaining projecting at the end of the guide tube in the locking position of the sleeve inside a part of the opening of the end fitting which does not receive the guide tube. This part of the opening of the end fitting comprises at least one radial cavity inside which a part of the locking shell is distorted radially to ensure the fastening of the locking sleeve; this device has a simple shape and can be placed and extracted from a guide tube in a simple and efficient manner.

For this purpose:
(1) the outer surface of the locking sleeve has successively in the axial direction a cylindrical part and a frusto-conical part without any radially protruding part;
(2) the fastening shell constituting the upper cylindrical part of the sleeve is integral with the lower frusto-conical part constituting the ring for expanding the tube and is substantially less thick than the upper part of the frusto-conical ring for expanding the tube; and
(3) an interlocking annular groove is machined in the upper part of the internal surface of the ring for expanding the tube.

BRIEF DESCRIPTION OF THE DRAWINGS

In order that the invention may be more clearly understood, a description will now be given, by way of example, with reference to the attached drawings, of several embodiments of a fastening device according to the invention, in the case of a demountable fuel assembly of a pressurized-water nuclear reactor.

DESCRIPTION OF PREFERRED EMBODIMENTS

Figure 1:
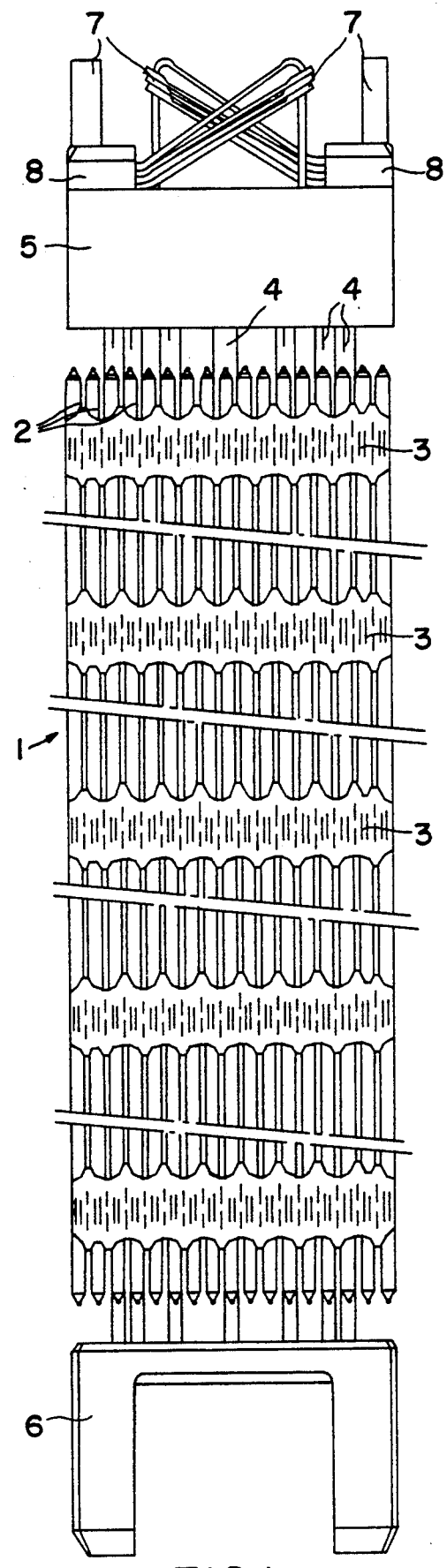
FIG. 1 is a front elevation of a fuel assembly of a pressurized-water nuclear reactor.

FIG. 1 shows a fuel assembly 1 consisting of a bundle of parallel fuel rods 2 held by spacers 3 arranged at certain intervals along the length of the rods 2. The spacers 3 consist of grids, each of whose cells receives a fuel rod. Certain positions in the grid lattice are occupied by guide tubes 4, which are longer than the fuel rods 2.

At one of their ends, the guide tubes 4 are connected to an end fitting 5 forming the upper end fitting of the fuel assembly and, at their other end, to a second end fitting 6 forming the lower end fitting.

When the assembly is in storage position under water in a pool, the upper end fitting 5 is accessible from above the pool. This upper end fitting 5 carries blade springs 7 responsible for holding the assembly in the reactor core, whose upper core plate comes to rest on the springs 7. The end fitting also comprises studs 8 projecting from to its upper face.

Figure 2:
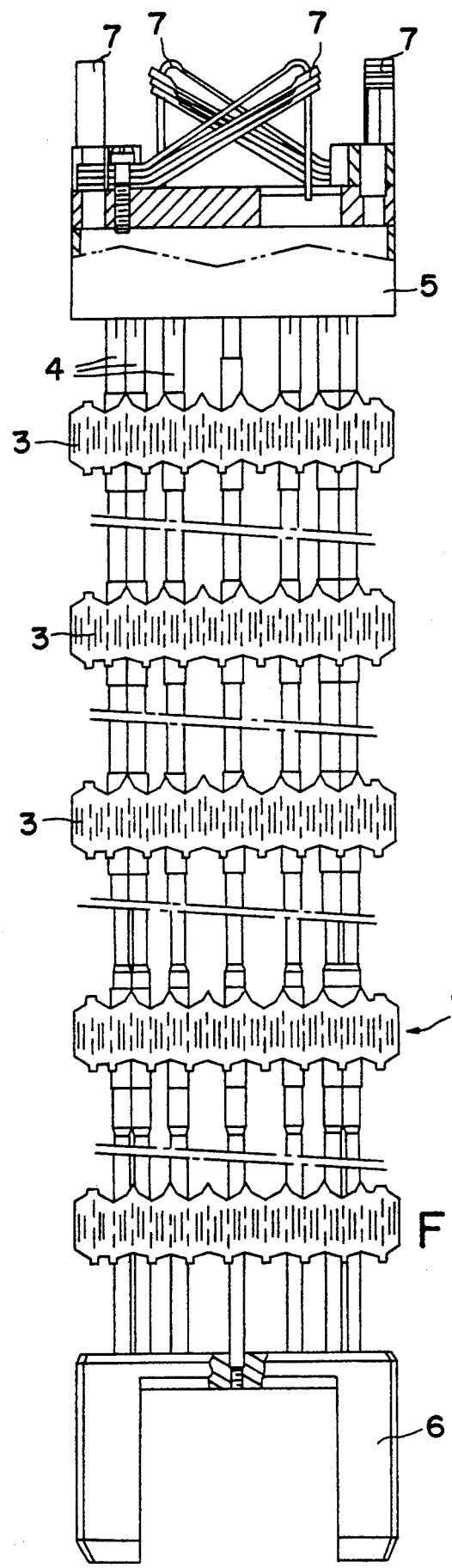
FIG. 2 is a front elevation of the framework of the assembly shown in FIG. 1.

FIG. 2 shows the fuel assembly framework 9 comprising the guide tubes 4, spacers 3 and the end fittings 5 and 6. This framework 9 serves as a housing for the fuel rods 2 of the bundle, which can be introduced into or extracted from the framework when the upper end fitting 5 is removed. Demountable couplings are provided between the ends of the guide tubes 4 and the upper end fitting 5 for performing the replacement or the removal of the rods.

Figure 3:
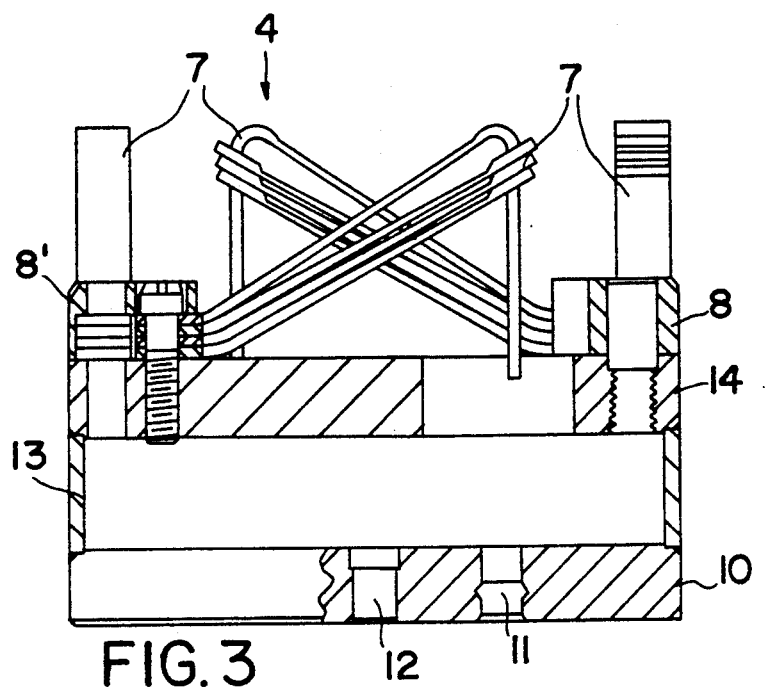
FIG. 3 is a front elevation with partial section of the upper end fitting of the fuel assembly.
Figure 4:
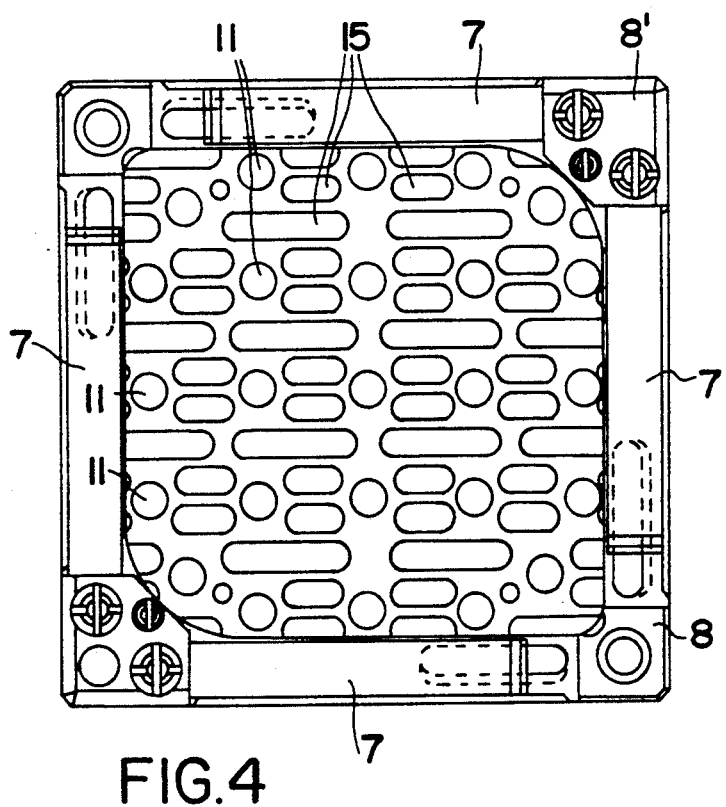
FIG. 4 is a top plan view of the upper end fitting in direction of arrow 4 shown in FIG. 3.

FIGS. 3 and 4 show an upper end fitting of a fuel assembly comprising an adapter plate 10 in which the guide tubes can engage inside openings 11 passing through this adapter plate and accessible from the upper part of the fuel assembly. The guide tube for the instrumentation of the fuel assembly, located in the central part, is received in a specially shaped opening 12. The upper end fitting of the assembly consists of the adapter plate 10 and a frame 14, connected together by means of a skirt 13 welded to the plate 10 and to the frame 14. The frame 14 carries the protuberances 8 comprising openings for centering and flanges 8' for holding the springs 7.

As can be seen in FIG. 4, the passage holes 11 permitting the guide tubes 4 to be fastened are arranged in defined positions corresponding to the positions of the twenty-four guide tubes of the assembly. Water passage holes 15 pass through the adapter plate 10 of the end fitting between the passage openings 11 for the guide tubes.

Figure 5:
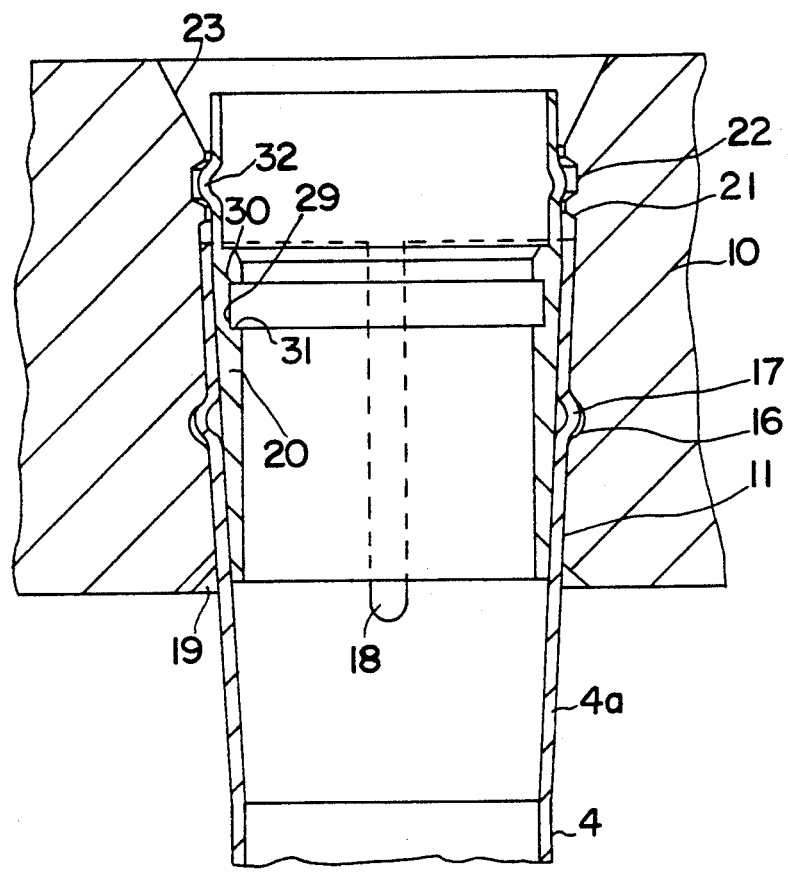
FIG. 5 is a view in axial section of a device for fastening a guide tube according to the invention.

As can be seen in FIG. 5, the upper part 4a of the tube 4 has a frusto-conical shape widening upwards, corresponding to the shape of the passage hole 11 in its lower part which receives the end of the tube 4.

The upper part 4a of the tube 4 additionally comprises two slots such as the slot 18, arranged in the direction of the generatrices of the conical frustum and in diametrically opposite positions. These two slots, such as the slot 18, define two frusto-conical sectors in the upper part 4a of the guide tube 4, which thus has a certain scope for radial distortion.

Furthermore, in the upper part 4a of the guide tube 4 there is provided, on each of the radially distortable sectors, an outwardly projecting part 17 in the shape of a part of a ring, which can be housed inside an annular widening 16 of the hole 11 when the guide tube 4 is fitted into the opening 11 of the adapter plate 10. Radial expansion of the upper part 4a of the tube 4 is provided by a locking sleeve 20. The interlocking and the fastening of the tube 4 in the adapter plate 10 and the demountable end fitting 5 are thus effected.

The part of the passage opening 11 of frusto-conical shape receiving the guide tube 4 and comprising the annular widening 16 has a widened entry part 19 facilitating the introduction of the tube 4 and ends in a shoulder 21.

Part 17 of the tube 4 of annular shape and projecting outwards is preformed before the introduction of the tube into the opening 11 and permits the axial locking of the tube 4 in the annular cavity 16 owing to the elasticity of the frusto-conical sectors. It should be noted that the upper part of the tube 4 does not abut on the shoulder 21 in its engagement position inside the adaptor plate. This arrangement makes it possible to facilitate fitting and improve the positioning of the guide tube 4 in the adapter plate 10.

The part of the opening 11 which is located above the shoulder 21 comprises cavities 22 in the shape of ring portions, machined radially inside the adapter plate 10.

Above the cavities 22, the opening 11 comprises a frusto-conical part 23 widening upwards and opening onto the upper face of the adapter plate 10.

Figure 6A:
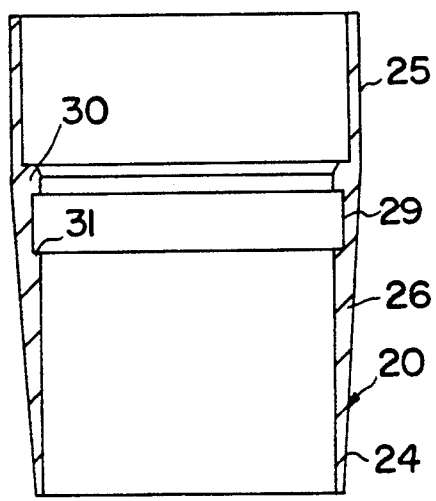
FIG. 6A is a sectional view on an axial plane of symmetry of the locking sleeve shown in FIG. 6.
Figure 6:
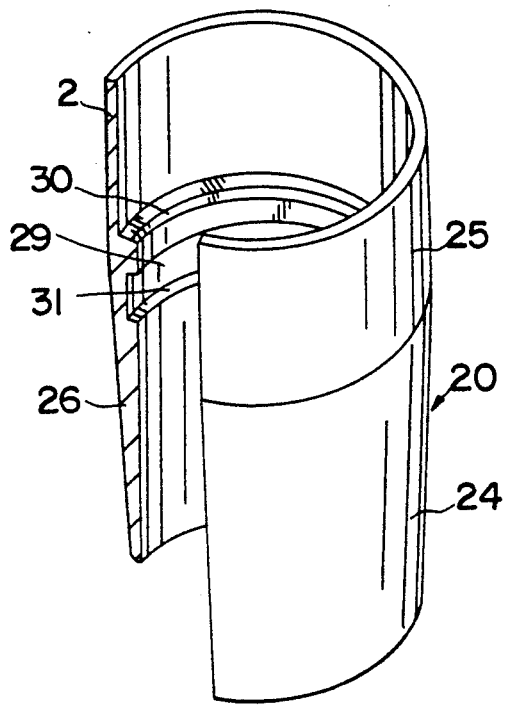
FIG. 6 is a cut-away perspective view of the locking sleeve of the fastening device shown in FIG. 5.

FIGS. 6 and 6A show a locking sleeve 20 of a device for fastening a guide tube such as shown in FIG. 5, which comprises a lower part 24 consisting of a shell of frusto-conical shape and an upper part 25 consisting of a shell of cylindrical shape.

The frusto-conical shell 24 which in its lower part comprises an engagement surface 24a is intended to come into a locking position inside the end 4a of the guide tube 4, as shown in FIG. 5. The shell 24 is responsible for the radial expansion of the frusto-conical sectors forming the upper part 4a of the tube 4 and the holding of the projections 17 in the annular widening 16 of the opening 11 of the adapter plate 10 of the end fitting.

The upper shell 25 forms the shell for fastening the locking ring which can be housed in the upper part of the hole 11 of the adapter plate 10 when the sleeve 20 is in locking position, as shown in FIG. 5.

According to the invention, the external surface of the locking sleeve is of cylindrical and frusto-conical shape and has no part protruding outwardly in the radial direction.

The locking sleeve 20 comprises a one-piece tubular wall 26, the outer surface of which has a cylindrical upper part and a frusto-conical lower part which are connected by means of the large base of the frusto-conical part.

The thickness of the wall 26 is variable over the height of this wall. The upper part 25 of the wall forms a collar of small thickness. The inner bore of the lower part 24 of the locking sleeve is of cylindrical form, with the result that the wall has a thickness decreasing from the top downwards in this lower part 24.

The part 24 of the wall has an annular groove 29 in the vicinity of its upper end, in its part of large thickness. The thickness of the wall of the part 24 is substantially larger than the thickness of the shell 25, at least in its upper part of large thickness.

The collar 25 is separated from the frusto-conical part 24 by a rim 30 projecting radially towards the inside of the sleeve. The groove 29 is delimited on the opposite side to the rim 30, i.e., downwards, by a shoulder 31.

The groove 29 can be used to put the locking sleeve 20 in place in a guide tube by introducing a gripping tool into the groove 29. An axial push can be exerted on the sleeve 20 by means of the shoulder 31, in order to obtain the locking of the guide tube which is kept apart by means of the frusto-conical part 24 engaged in the guide tube, this part 24 constituting the ring for expanding the tube.

The collar 25 is then located in a part of the bore of the connector of the assembly which is not occupied by the guide tube. One or more radial indentations are machined in this part of the bore of the connector. After locking of the guide tube, the collar 25 is pushed into the radial indentations of the bore of the connector, and it ensures that the locking sleeve is fastened in these.

Figure 7A:
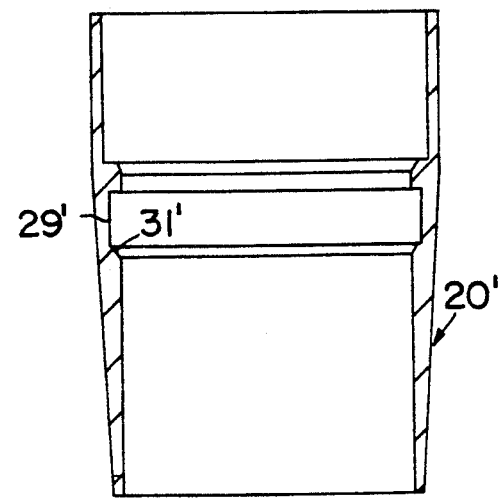
FIG. 7A is a sectional view on an axial plane of symmetry of the locking sleeve shown in FIG. 7.
Figure 7:
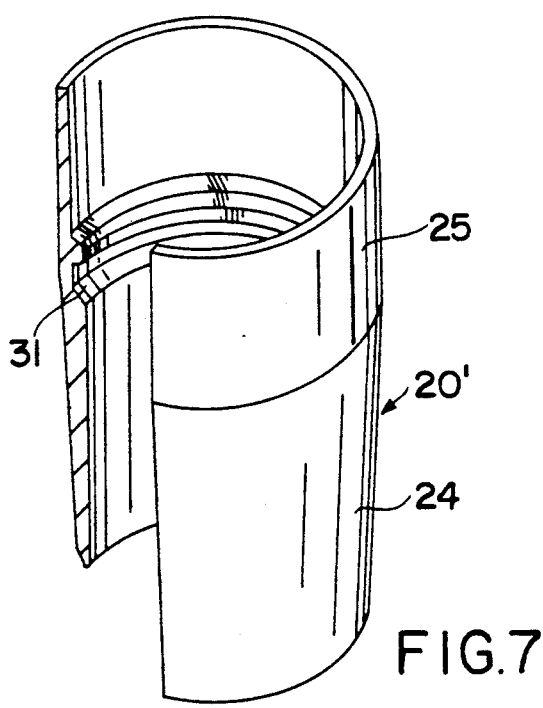
FIG. 7 is a cut-away perspective view of locking sleeve of a second embodiment of a fastening device according to the invention.

FIGS. 7 and 7A shown an alternative embodiment of the locking sleeve of FIGS. 6 and 6A. The sleeve 20' is identical to the sleeve 20, except that it has a frusto-conical shoulder 31' instead of the plane shoulder 31 used during the installation of the blocking sleeve in the guide tube.

As an alternative embodiment, during the installation of the sleeve, the thrust on the sleeve can be exerted through the radially protruding rim 30.

The fastening of the locking sleeve can be ensured by distortion of the regions 32 of the shell 25 inside the cavities 22, using tools of known type, introduced into the upper part of the sleeve. The axial and rotational locking of the sleeve 20 is thus produced.

To perform the dismantling of the end fitting of the assembly it is necessary, in a first step, to perform the extraction of the locking sleeves 20 introduced into the end of the guide tube.

In the case of a fastening device such as shown in FIGS. 6 and 7, the extraction of a sleeve is effected thanks to interlocking members such as the claws of a traction tool that may be introduced into the groove 29 or 29'.

The interlocking members of the tool for pulling the sleeve can be easily fitted through the inside of the sleeve, with a control from inside the pool.

The traction on the sleeve effected through a groove in its inner surface allows the dismantling to be effected more easily by extracting the fastening distorted zones 32 from the cavities 22. The sleeve is no more retained in the end fitting and the ring 24 for expanding the tube can be extracted from the guide tube 4.

It is possible to conceive interlocking grooves accessible through the inside of the sleeve of a different shape.

Finally, the invention applies to the case of any fuel assembly for a light-water reactor comprising a demountable end fitting in which the guide tubes of the assembly are fastened by locking sleeves.

What is claimed is:

1. Device for demountable fastening of a guide tube into an end fitting of a fuel assembly of a nuclear reactor cooled by light water comprising a bundle of parallel fuel rods held in a framework (9) consisting of guide tubes (4), spacers (3) and end fittings (5, 6) fastened to ends of said guide tubes (4), at least one of said end fittings (5, 10) being fastened demountably to one of said ends of each of said guide tubes (4) by means of a radially distortable end part (4a) of said guide tube (4), said end part having a radially outwardly projecting interlocking part (17) engaged inside and over a part of the length of an opening (11) passing through a said end fitting (5, 10), said opening (11) comprising, in said part receiving a said guide tube (4), an annular bulge (16) intended to receive said interlocking part (17) of said guide tube, radial expansion of said end of said guide tube and retention of said interlocking part (17) in said annular bulge (16) of said opening (11) of said end fitting (5, 10) being provided by a locking sleeve (20) comprising a ring (24) for expanding said guide tube (4) and a shell (25) for fastening in said end fitting, projecting at said end of said guide tube in the locking position of said sleeve (20), inside a part of said opening (11) of said end fitting (5, 10) which does not receive said guide tubes (4), said part of said opening (11) of said end fitting (10) comprising at least one radial cavity (22) inside which a part (32) of the fastening shell (25) is distorted radially to ensure fastening of said locking sleeve (20), wherein:

(a) the outer surface of said locking sleeve (20) has, successively in an axial direction of said sleeve, a cylindrical upper part and a frusto-conical lower part, said sleeve being free of any radially outwardly protruding part;

(b) said fastening shell (25) constituting said cylindrical upper part of said sleeve is integral with said frusto-conical lower part constituting said ring (24) for expanding said tube and said fastening shell has a thickness substantially smaller than the thickness of the upper part of the frusto-conical ring for expanding said tube; and (c) an interlocking annular groove (29) is machined in the upper part of an internal surface of said ring (24) for expanding said tube.

2. Fastening device according to claim 1, wherein said interlocking groove (29) is separated from said fastening shell (25) by a rim (30) projecting radially inwards.

3. Fastening device according to claim 1, wherein said interlocking groove (29) has a lower edge in the shape of a frusto-conical rim (31) coaxial with said sleeve.

* * * * *